United States Patent
Kim et al.

(10) Patent No.: US 9,391,758 B2
(45) Date of Patent: Jul. 12, 2016

(54) METHOD AND APPARATUS FOR ADJUSTING TRANSMISSION TIMING IN WIRELESS ACCESS SYSTEM SUPPORTING CARRIER AGGREGATION

(75) Inventors: Jinmin Kim, Anyang-si (KR); Hyunwoo Lee, Anyang-si (KR); Seunghee Han, Anyang-si (KR)

(73) Assignee: LG Electronics Inc., Seoul (KR)

(*) Notice: Subject to any disclaimer, the term of this patent is extended or adjusted under 35 U.S.C. 154(b) by 145 days.

(21) Appl. No.: 14/113,962

(22) PCT Filed: May 7, 2012

(86) PCT No.: PCT/KR2012/003567
§ 371 (c)(1),
(2), (4) Date: Oct. 25, 2013

(87) PCT Pub. No.: WO2012/153961
PCT Pub. Date: Nov. 15, 2012

(65) Prior Publication Data
US 2014/0050186 A1    Feb. 20, 2014

Related U.S. Application Data

(60) Provisional application No. 61/483,567, filed on May 6, 2011.

(51) Int. Cl.
H04W 4/00 (2009.01)
H04L 5/00 (2006.01)
H04W 56/00 (2009.01)

(52) U.S. Cl.
CPC .............. *H04L 5/0078* (2013.01); *H04L 5/001* (2013.01); *H04W 56/0045* (2013.01)

(58) Field of Classification Search
CPC ................................................. H04W 56/0045
USPC .......................................................... 370/329
See application file for complete search history.

(56) References Cited

U.S. PATENT DOCUMENTS

2011/0103331 A1    5/2011  Kuo
2011/0249641 A1*  10/2011  Kwon ............... H04W 74/0833
                                                        370/329
(Continued)

FOREIGN PATENT DOCUMENTS

CN       102014477 A        4/2011
JP       2013-516917 A      5/2013
(Continued)

OTHER PUBLICATIONS

Intel corporation: "Enhancements on MAC procedures to support CA with multiple TA", 3GPP Draft; R2-112137-MTA-MAC, 3rd Generation Partnership Project (3GPP), Mobile Competence Centre; 650, Route Des Lucioles; F-06921 Sophia-Antipolis Cedex; France, vol. RAN WG2, no. Shanghai, China; Apr. 11-15, 2011, XP050494548.

(Continued)

*Primary Examiner* — Asad Nawaz
*Assistant Examiner* — Syed S Ali
(74) *Attorney, Agent, or Firm* — Dentons US LLP

(57) ABSTRACT

The present disclosure provides methods for allocating a timing advance (TA) value, which is used in a wireless access system supporting carrier aggregation (CA), methods for adjusting a wireless frame transmission time using the TA value, and apparatuses for supporting same. The method for adjusting the transmission timing in the wireless access system supporting carrier aggregation, according to one embodiment of the present disclosure, comprises the following steps: receiving a physical downlink control channel (PDCCH) signal including a reservation bit (for example, a service cell indicator) for indicating at least one serving cell; receiving a media access control (MAC) message including the TA value on an uplink wireless frame; and transmitting an uplink signal by applying the TA value from a serving cell indicated by the reservation bit.

3 Claims, 12 Drawing Sheets

(56) References Cited

U.S. PATENT DOCUMENTS

| | | | |
|---|---|---|---|
| 2012/0063302 A1* | 3/2012 | Damnjanovic | H04W 56/0045 370/228 |
| 2012/0257569 A1* | 10/2012 | Jang et al. | 370/328 |
| 2012/0275390 A1* | 11/2012 | Korhonen | H04W 74/006 370/329 |
| 2012/0300714 A1* | 11/2012 | Ng | H04W 56/0045 370/329 |
| 2013/0039202 A1* | 2/2013 | Feuersanger | H04L 5/001 370/252 |
| 2013/0051342 A1* | 2/2013 | Aiba et al. | 370/329 |
| 2013/0114572 A1* | 5/2013 | Fong | H04L 1/0038 370/336 |
| 2013/0150054 A1* | 6/2013 | Axmon et al. | 455/440 |
| 2014/0050205 A1* | 2/2014 | Ahn | H04W 52/146 370/336 |
| 2014/0086224 A1* | 3/2014 | Kwon | H04W 52/0219 370/336 |
| 2014/0161110 A1* | 6/2014 | Kim | H04L 5/001 370/336 |
| 2014/0348078 A1* | 11/2014 | Kim | H04W 52/146 370/329 |
| 2014/0369322 A1* | 12/2014 | Fwu et al. | 370/336 |
| 2015/0333879 A1* | 11/2015 | Yang | H04W 56/0005 370/330 |

FOREIGN PATENT DOCUMENTS

| | | |
|---|---|---|
| KR | 10-2009-0076805 A | 7/2009 |
| KR | 10-2011-0008304 A | 1/2011 |
| WO | 2010-151213 A1 | 12/2010 |
| WO | 2011/032035 A2 | 3/2011 |
| WO | 2011-050743 A1 | 5/2011 |

OTHER PUBLICATIONS

Alcatel-Lucent, et al: "Maintaining UL synchronization for deactivated SCell", 3GPP Draft; R2-113234 Multiple ta timers_V0.1, 3rd Generation Partnership Project (3GPP), Mobile Competence Centre; 650, Route Des Lucioles; F-06921 Sophia-Antipolis Cedex; France, vol. RAN WG2, no. Barcelona, Spain; May 9-13, 2011, XP050495174.

InterDigital Communications: "Support for multiple timing advance in LTE CA", 3GPP Draft; R2-113255 (REL-11 Support for multiple Timing Advance LTE CA), 3rd Generation Partnership Project (3GPP), Mobile Competence Centre; 650, Route Des Lucioles; F-06921 Sophia-Antipolis Cedex; France, vol. RAN WG2, no. Barcelona, Spain; May 9-13, 2011, XP050495407.

"3rd Generation Partnership Project; Technical Specification Group Radio Access Network; Evolved Universal Terrestrial Radio Access (E-UTRA); Medium Access Control (MAC) protocol specification (Release 10)", 3GPP Standard; 3GPP TS 36.321, 3rd Generation Partnership Project (3GPP), Mobile Competence Centre; 650, Route Des Lucioles; F-06921 Sophia-Antipolis Cedex; France, no. V10.1. 0, Apr. 5, 2011, pp. 1-53, XP050477203.

* cited by examiner

FIG. 10
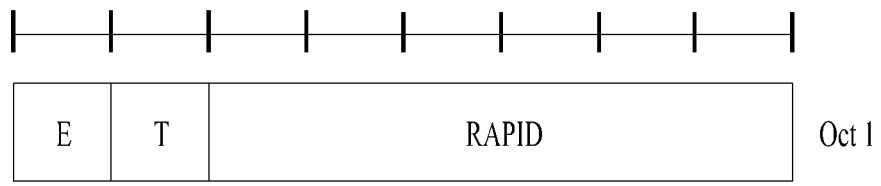
(a)
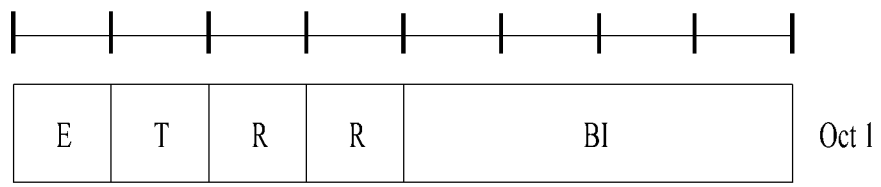
(b)
FIG. 11
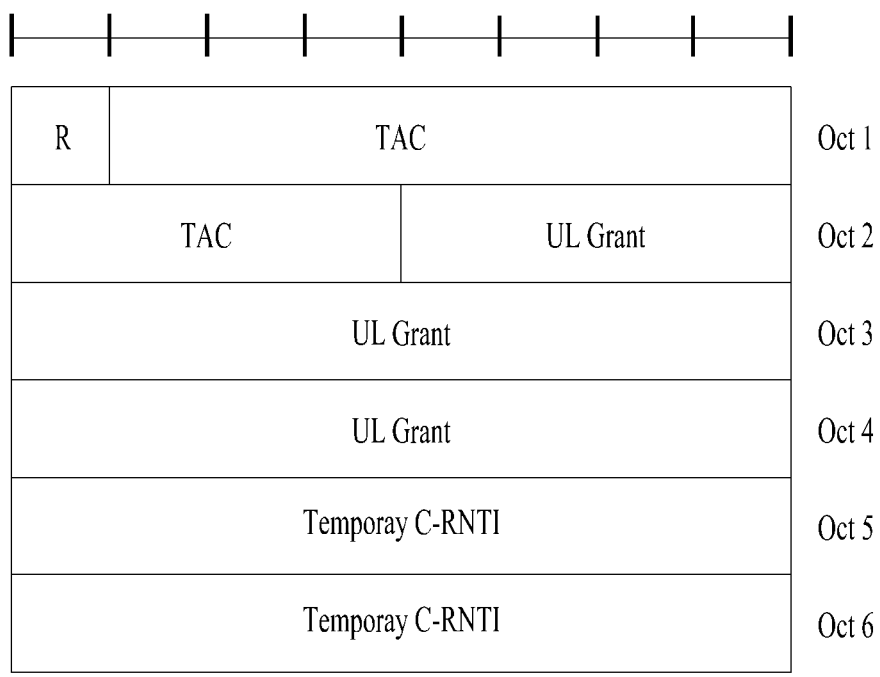

METHOD AND APPARATUS FOR ADJUSTING TRANSMISSION TIMING IN WIRELESS ACCESS SYSTEM SUPPORTING CARRIER AGGREGATION

This application is the U.S. National Phase of International Application No. PCT/KR2012/003567 filed on May 7, 2012, which claims priority to U.S. Provisional Application No. 61/483,567, filed May 6, 2011, all of which are hereby incorporated by reference as if fully set forth herein.

TECHNICAL FIELD

The present disclosure relates to a wireless access system, and more particularly, to methods for allocating a Timing Advance (TA) value, methods for adjusting the transmission time of radio frames using a TA value, and apparatuses supporting the same in a wireless access system supporting Carrier Aggregation (CA).

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

A Timing Advance (TA) transmission scheme refers to transmission of an uplink frame from a User Equipment (UE) earlier than the reception timing of a downlink frame, taking into account a propagation delay between a Base Station (BS) and the UE. Conventionally, TA is defined only for a primary component carrier (i.e. a Primary Cell (PCell)). However, the conventional TA transmission scheme cannot be still used in a Carrier Aggregation (CA) environment where one or more carriers (i.e. serving cells) are aggregated.

An object of the present disclosure devised to solve the problem lies on a method for efficiently transmitting and receiving an uplink frame and a downlink frame.

Another object of the present disclosure is to provide a method for allocating a plurality of TA/timing adjustment values in a CA environment.

Another object of the present disclosure is to provide a method for enabling a UE to perform TA by transmitting a TA value for each serving cell or each inter-band to the UE in a CA environment.

Another object of the present disclosure is to provide a method for enabling a UE to perform TA for a serving cell or an inter-band by transmitting a transmission timing difference to the UE in a CA environment.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The object of the present disclosure can be achieved by providing a method for adjusting a transmission timing in a wireless access system supporting Carrier Aggregation (CA), including receiving a Physical Downlink Control Channel (PDCCH) signal including a reserved bit (a serving cell indicator) indicating at least one serving cell, receiving a Medium Access Control (MAC) message including a Timing Advance (TA) value for an uplink radio frame, and transmitting an uplink signal by applying the TA value to the at least one serving cell indicated by the reserved bit.

In another aspect of the present disclosure, provided herein is a method for adjusting a transmission timing in a wireless access system supporting CA, including transmitting a PDCCH signal including a reserved bit (a serving cell indicator) indicating at least one serving cell, transmitting a MAC message including a TA value for an uplink radio frame, and receiving an uplink signal in which the TA value is applied to the at least one serving cell indicated by the reserved bit.

In another aspect of the present disclosure, provided herein is a terminal for adjusting a transmission timing in a wireless access system supporting CA, including a transmission module, a reception module, and a processor configured to adjust the transmission timing. The terminal receives a PDCCH signal including a reserved bit (a serving cell indicator) indicating at least one serving cell through the reception module, receives a MAC message including a TA value for an uplink radio frame through the reception module, applies the TA value to the at least one serving cell indicated by the reserved bit through the processor, and transmits an uplink signal at a transmission timing adjusted by the applied TA value through the transmission module.

According to the aspect of the present disclosure, if a Cyclic Redundancy Check (CRC) of a Downlink Control Information (DCI) format of the PDCCH is scrambled with a Random Access Radio Network Temporary Identifier (RA-RNTI), a Paging Radio Network Temporary Identifier (P-RNTI), or a System Information Radio Network Temporary Identifier (SI-RNTI), the reserved bit may be a Hybrid ARQ (HARD) process number field included in the DCI format.

The DCI format may be DCI Format 1A for Downlink Shared Channel (DL-SCH) scheduling.

The reserved bit may indicate an inter-band including the at least one serving cell. Then the TA value may be applied commonly to the at least one serving cell of the inter-band.

The afore-described aspects of the present disclosure are merely a part of embodiments of the present disclosure. Those skilled in the art will derive and understand various embodiments reflecting the technical features of the present disclosure from the following detailed description of the present disclosure.

Advantageous Effects

According to the embodiments of the present disclosure, the following effects can be achieved.

First, a UE and a BS can efficiently transmit and receive an uplink frame and a downlink frame.

Secondly, a UE can transmit an uplink frame accurately using a TA value even in a CA environment.

Thirdly, since multiple TA values are supported in an interband CA situation, a UE can adjust the transmission time of an uplink radio frame.

Fourthly, a BS can receive an uplink signal without Inter-Symbol Interference (ISI) using multiple TA values even in a CA environment.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 10 illustrates exemplary MAC Packet Data Unit (MAC PDU) subheaders used in embodiments of the present disclosure;

FIG. 11 illustrates an exemplary MAC Random Access Response (MAC RAR) used in embodiments of the present disclosure;

BEST MODE

Figure 1:
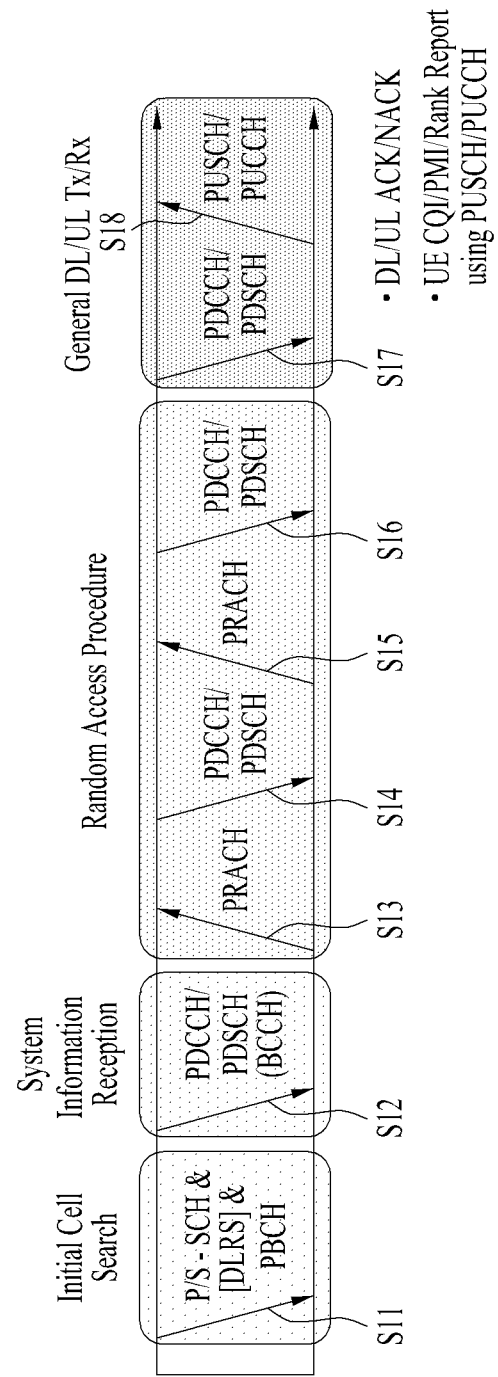
FIG. 1 illustrates physical channels and a general signal transmission method using the physical channels, which may be used in embodiments of the present disclosure.

Embodiments of the present disclosure relate to methods for allocating a Timing Advance (TA) value, methods for adjusting the transmission time of a radio frame based on a TA value, and apparatuses supporting the same in a wireless access system supporting Carrier Aggregation (CA).

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, and 3GPP TS 36.321.

That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, TA is interchangeable with time advance, timing adjustment, or time adjustment in the same meaning.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3 GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
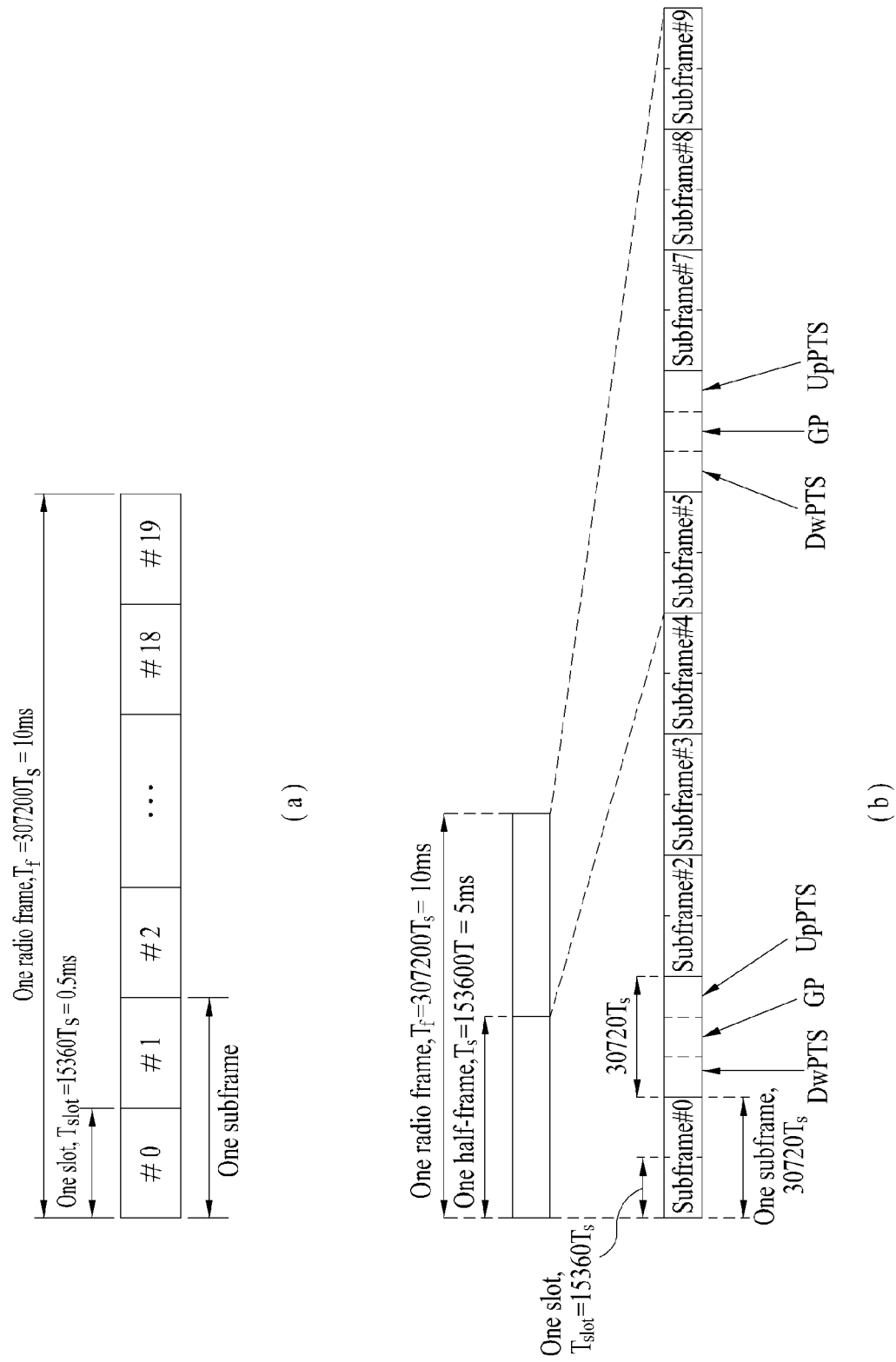
FIG. 2 illustrates radio frame structures used in embodiments of the present disclosure.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15\ \text{kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 5:
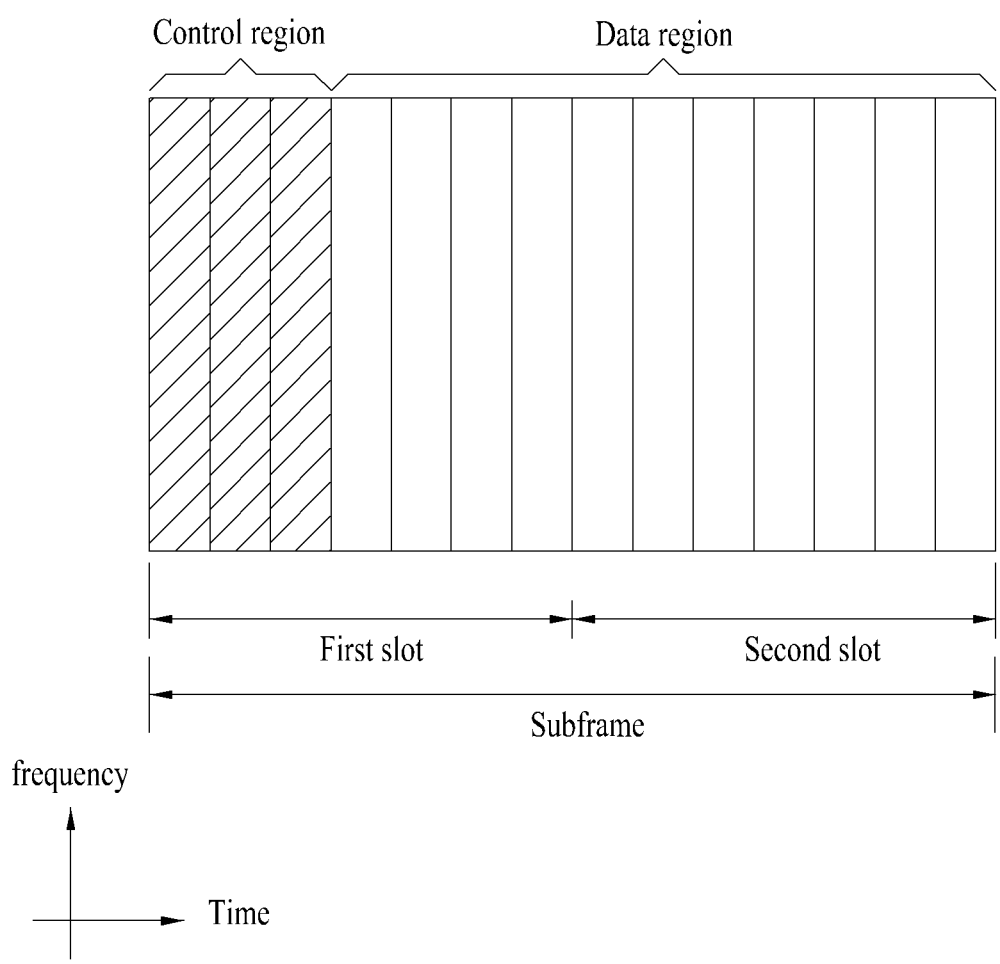
FIG. 5 illustrates a structure of a DL subframe, which may be used in embodiments of the present disclosure.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel

TABLE 1

| | | Normal cyclic prefix in downlink | | | Extended cyclic prefix in downlink | |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
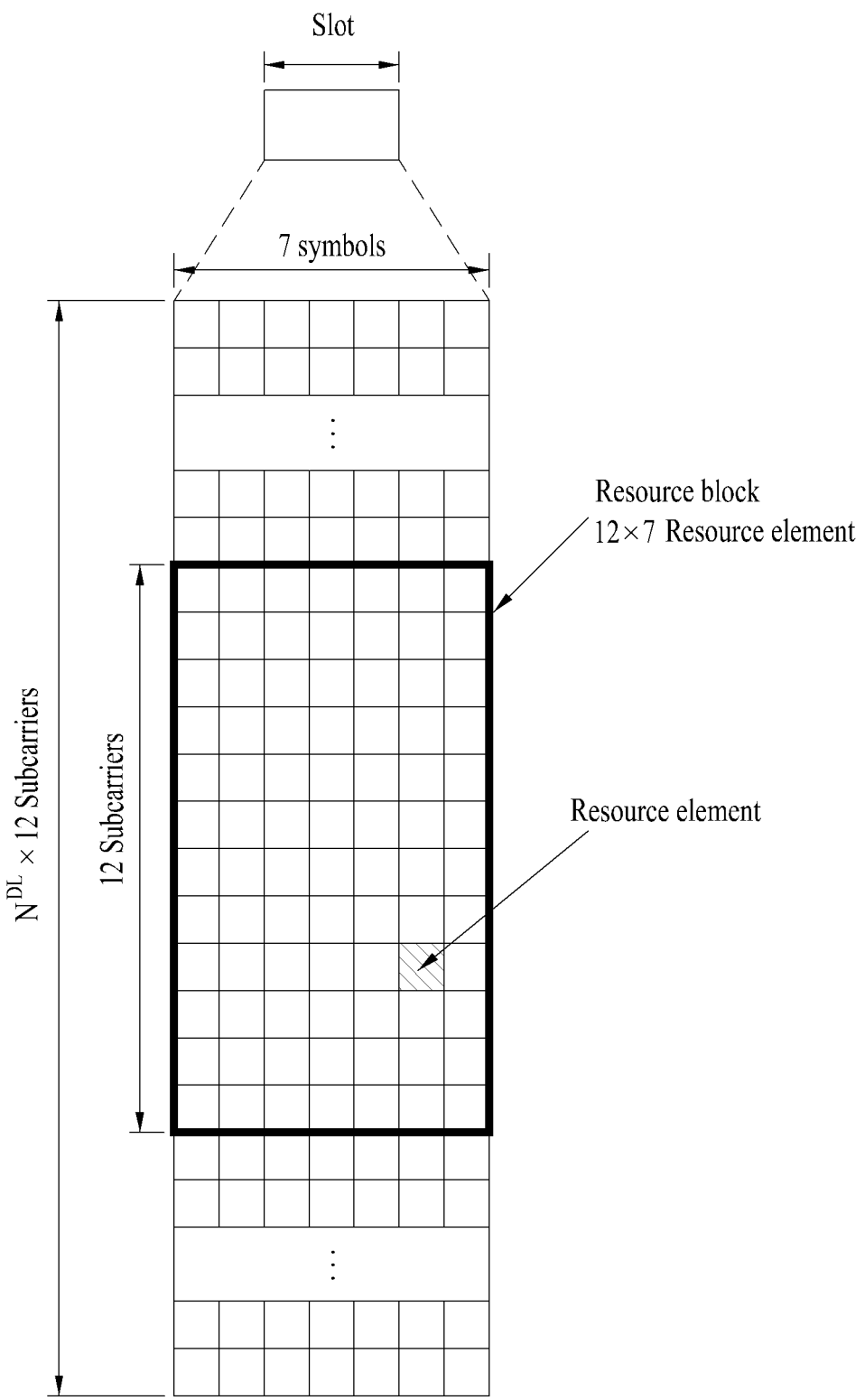
FIG. 3 illustrates a structure of a DownLink (DL) resource grid for the duration of one DL slot, which may be used in embodiments of the present disclosure.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 4:
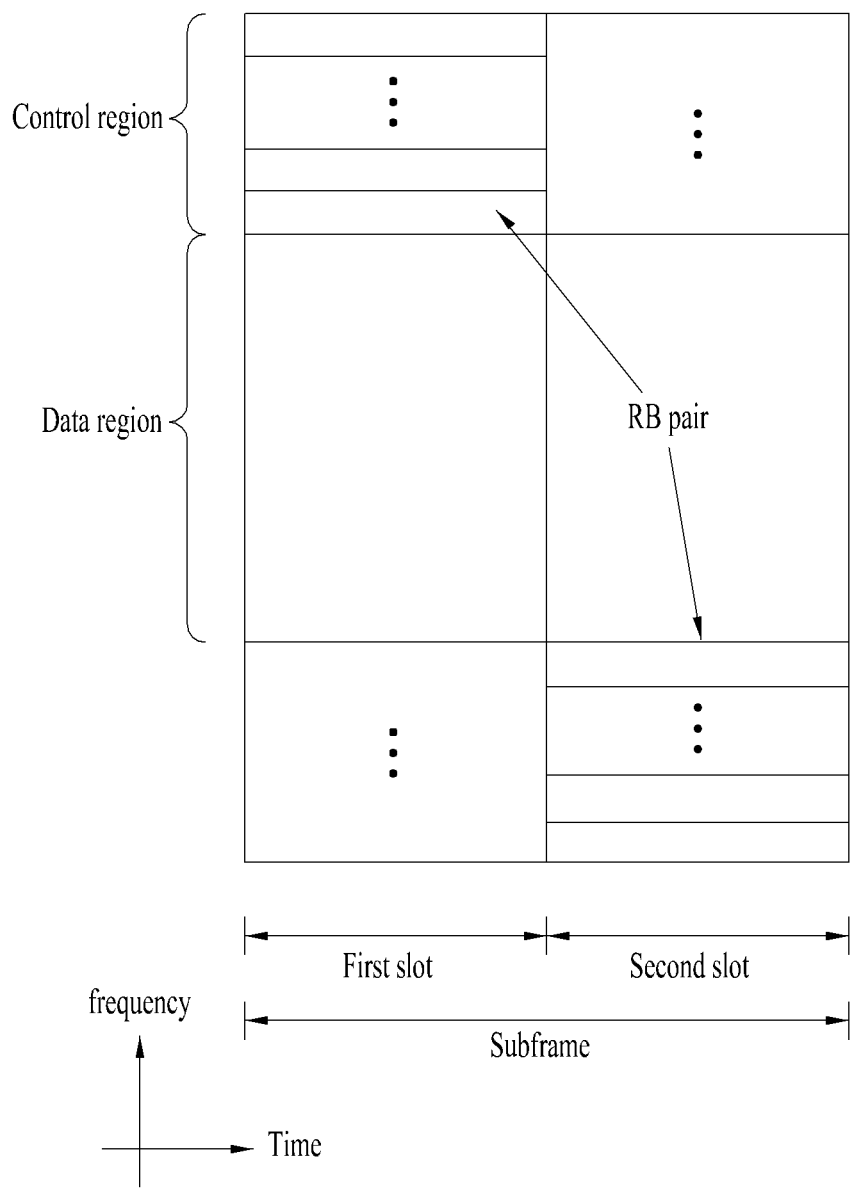
FIG. 4 illustrates a structure of an UpLink (UL) subframe, which may be used in embodiments of the present disclosure.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

(DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ ($=\lfloor N_{REG}/9 \rfloor$) and the CCEs are indexed from 0 to $N_{CCE}-1$.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |

TABLE 3-continued

| DCI Format | Description |
| --- | --- |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 7 transmission modes are available to UEs:
 (1) Single antenna port: port 0;
 (2) Transmit diversity;
 (3) Open-loop spatial multiplexing;
 (4) Closed-loop spatial multiplexing;
 (5) MU-MIMO;
 (6) Closed-loop rank-1 precoding; and
 (7) Single antenna port: port 5.

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for Format 0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{(Y_k+m) \bmod \lfloor N_{CCE,k}/L \rfloor\}+i \qquad \text{[Equation 1]}$$

where $M^{(L)}$ is the number of PDCCH candidates with CCE aggregation level L to be monitored in the SS, m=0, ..., $M^{(L)}-1$, i is the index of a CCE in each PDCCH candidate, and i=0, ..., L-1. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \qquad \text{[Equation 2]}$$

where $Y_{-1} = n_{RNTI} \neq 0$, $n_{RNTI}$ indicating an RNTI value. A=39827 and D=65537.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
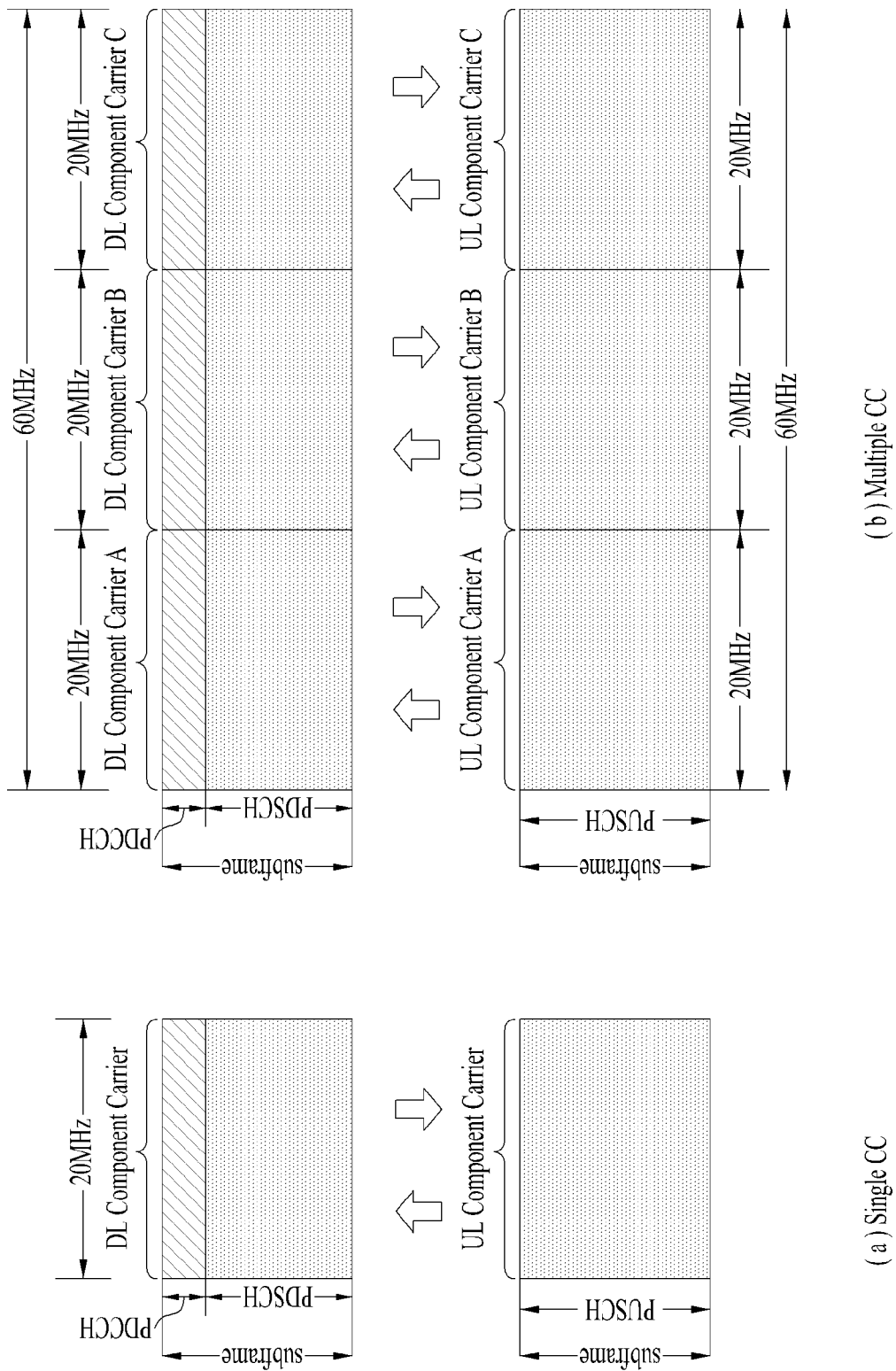
FIG. 6 illustrates an example of Component Carriers (CCs) and Carrier Aggregation (CA) in a Long Term Evolution-Advanced (LTE-A) system, which are used in embodiments of the present disclosure.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
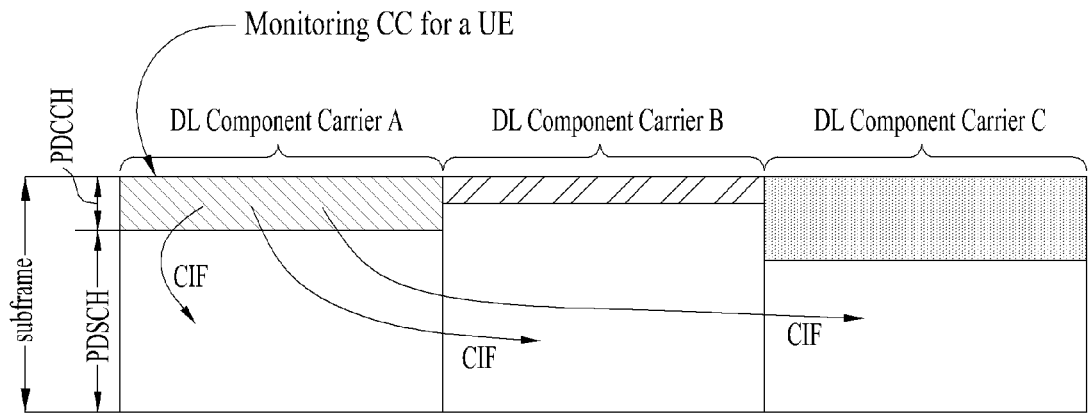
FIG. 7 illustrates a cross carrier-scheduled subframe structure in the LTE-A system, which is used in embodiments of the present disclosure.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. Overview of UL/DL Scheduling in TDD System 3.1 UL-DL Configurations in TDD System UL-DL configurations for frame structure type 2 represent rules of allocating (or reserving) each subframe as a DL subframe or a UL subframe. [Table 6] lists such UL-DL configurations.

TABLE 6

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 5 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to [Table 6], "D" represents a DL subframe, "U" represents a UL subframe, and "S" represents a special subframe including a DwPTS, a GP, and an UpPTS in a radio frame. 7 UL-DL configurations are available and differ in the positions or numbers of DL subframes, special subframes, and UL subframes.

A time point at which DL switches to UL or UL switches to DL is called a switch point. Switch-point periodicity is a period in which switching between a UL subframe and a DL subframe is repeated in the same manner. The switch-point periodicity is 5 ms or 10 ms. If the switch-point periodicity is 5 ms, a special subframe S exists in every half-frame and if the switch-point periodicity is 10 ms, a special subframe S is confined to the first half-frame.

In every UL-DL configuration, subframe 0, subframe 5, and the DwPTS are used for DL transmission, and the UpPTS and the subframe following a special subframe are always used for UL transmission.

The UL-DL configurations are system information that may be known to both an eNB and UEs. Each time UL-DL configuration information is changed, the eNB may indicate the change in the UL-DL allocation state of a radio frame to a UE by transmitting only the index of configuration information. The configuration information is a kind of DCI and may be transmitted on a DL control channel, PDCCH like other scheduling information. The configuration information may be broadcast to all UEs within a cell on a BCH. The number of half-frames in a radio frame, the number of subframes in a half-frame, and DL-UL subframe combinations in the TDD system are purely exemplary.

3.2. UL/DL Scheduling in TDD System

A DL/UL subframe configuration is different according to a UL-DL configuration in the TDD system. Therefore, the transmission timings of a PUSCH and a PHICH are different according to a UL-DL configuration. The transmission timings of a PUSCH and a PHICH may be different according to the index (or number) of a subframe.

In the LTE system, a UL/DL timing relationship among a PUSCH, a PDCCH that schedules the PUSCH, and a PHICH that carries a DL HARQ ACK/NACK for the PUSCH is preset.

[Table 7] illustrates the transmission timings of a PDCCH and a PUSCH associated with the PDCCH for each UL-DL configuration.

TABLE 7

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | 4 | | | | | 4 | | |
| 3 | 4 | | | | | | | 4 | 4 | 4 |
| 4 | | | | | | | | | 4 | 4 |
| 5 | | | | | | | | | 4 | |
| 6 | 7 | 7 | | | | 7 | 7 | | | 5 |

Referring to [Table 7], in UL-DL configuration 1 to UL-DL configuration 6, for retransmission after receiving a UL grant on a PDCCH or receiving a PHICH from an eNB in an $n^{th}$ DL subframe, the UE transmits a PUSCH in an $(n+k)^{th}$ UL subframe according to the index of the DL subframe carrying the PDCCH (or the PHICH). Herein, k values are listed in [Table 7].

In the case of UL-DL configuration 0, a PUSCH is transmitted in a UL subframe indicated by [Table 7], in an $(n+7)^{th}$ UL subframe, or both, according to UL indexes set in a UL DCI format, the index of a DL subframe carrying a PHICH, and $I_{PHICH}$ received by higher-layer signaling or determined by the index of a UL subframe carrying a PUSCH.

4. UL-DL Frame Timing

Figure 8:
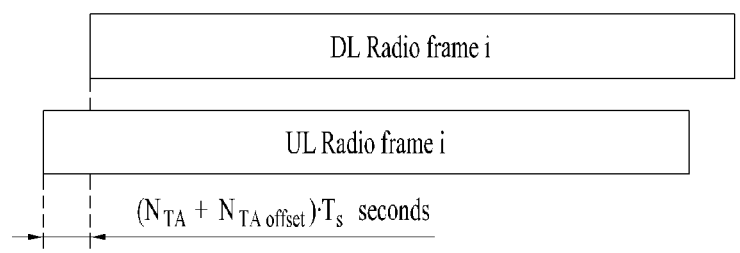
FIG. 8 illustrates one of DL-UL timing relationships used in embodiments of the present disclosure.

FIG. 8 illustrates one of UL-DUL timing relationships used in embodiments of the present disclosure.

Referring to FIG. 8, a UE starts to transmit UL radio frame i $(N_{TA}+N_{TA\ offset})\times T_s$ seconds $(0 \leq N_{TA} \leq 20512)$ before a corresponding DL radio frame is transmitted. $N_{TA\ offset}=0$ in frame structure type 1 and $N_{TA\ offset}=624$ in frame structure type 2 in FIG. 1. However, all slots of the radio frame are not transmitted. For example, only a part of the slots of the radio frame is transmitted in the TDD system.

Upon receipt of a Timing Advance Command (TAC), the UE adjusts the UL transmission timing of a PUCCH/PUSCH/SRS in a PCell. The TAC indicates the amount of UL timing adjustment for a current UL timing, which is a multiple of $16T_s$. The UL transmission timing of a PUSCH/SRS in an SCell is identical to the UL transmission timing of a PUSCH/SRS in the PCell.

In the case of a random access response, a 11-bit TAC is an index $T_A$ (e.g. $T_A=0, 1, 2, \ldots, 1282$) from which $N_{TA}$ is determined. The TA value for timing adjustment, $N_{TA}$ is given as $T_A \times 16$. In another case, a 6-bit TAC indicates a $T_A$ value, that is, an adjustment value for a current TA value $N_{TA,old}$ to get a new TA value $N_{TA,new}$. For example, $N_{TA,new}=N_{TA,old}+(T_A-31)\times 16$. The adjustment value $N_{TA}$ is positive-signed or negative-signed, indicating advance or delay of a UL transmission timing by a given value.

Regarding a TAC received in subframe n, timing adjustment starts from subframe n+6 based on the TAC. If the timing adjustment leads to overlap between PUCCH/PUSCH/SRS transmissions in subframe n and n+1, the UE transmits the whole subframe n, without the overlapped part of subframe n+1. If a DL reception timing is changed without a TAC and not corrected or partially corrected by UL timing adjustment, the UE changes $N_{TA}$.

4.1 TAC MAC Control Element

Figure 9:
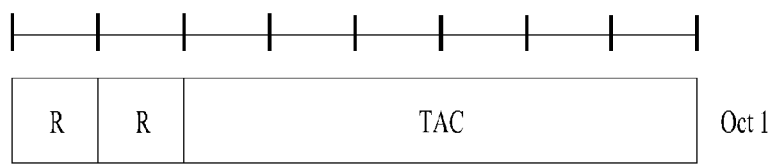
FIG. 9 illustrates an exemplary Timing Advance Command Medium Access Control (TAC MAC) control element used in embodiments of the present disclosure.

FIG. 9 illustrates an exemplary Timing Advance Command Medium Access Control (TAC MAC) control element used in embodiments of the present disclosure.

The TAC MAC control element is defined by a MAC PDU subheader with a Logical Channel ID (LCID). [Table 8] illustrates exemplary LCIDs.

TABLE 8

| Index | LCID values |
|---|---|
| 00000 | CCCH |
| 00001-01010 | Identify of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

In FIG. 9, the TAC MAC control element includes two R fields and a TAC field. Each of the R fields is set to '0' as a reserved bit and the TAC field indicates an index $T_A$ used for a UE to control the amount of timing adjustment.

FIG. 10 illustrates exemplary MAC subheaders used in embodiments of the present disclosure.

In the embodiments of the present disclosure, a MAC PDU includes a MAC header, zero or more MAC Random Access Response (RAR) fields, and an optional padding. A MAC RAR field indicates a MAC header having a variable value for a random access response and includes zero or more MAC PDU subheaders. Each MAC PDU subheader except for a Backoff Indicator subheader corresponds to a MAC RAR. If the Backoff Indicator subheader is included, it is included only once, as the first subheader of the MAC PDU header.

Referring to FIG. 10(a), a MAC PDU subheader includes three header fields E/T/RAPID. Referring to FIG. 10(b), the Backoff Indicator subheader includes five header fields E/T/R/R/BI.

E is an extension field indicating whether more fields are present in a corresponding MAC header. For example, the E field indicates whether at least one another field follows the E/T/RAPID field.

T is a type field indicating whether the MAC subheader contains a random access ID or a Backoff Indicator (BI). For example, the T field is set to '0' to indicate the presence of a BI field in the subheader and to '1' to indicate the presence of a Random Access Preamble ID (RAPID) field.

BI is a Backoff Indicator field that identifies the overload condition of a corresponding cell. The size of the BI field is 4 bits. The RAPID field identifies a transmitted random access preamble. The size of the RAPID field is 6 bits.

FIG. 11 illustrates an exemplary MAC RAR used in embodiments of the present disclosure.

Referring to FIG. 11, the MAC RAR includes four fields, R/TAC/UL Grant/Temporary C-RNTI. The MAC RAR may be padded with bits at its end. The presence and length of the padding bits may be determined implicitly based on a Transport Block (TB) size, the number of RARs, and the size of a MAC header.

Figure 12:
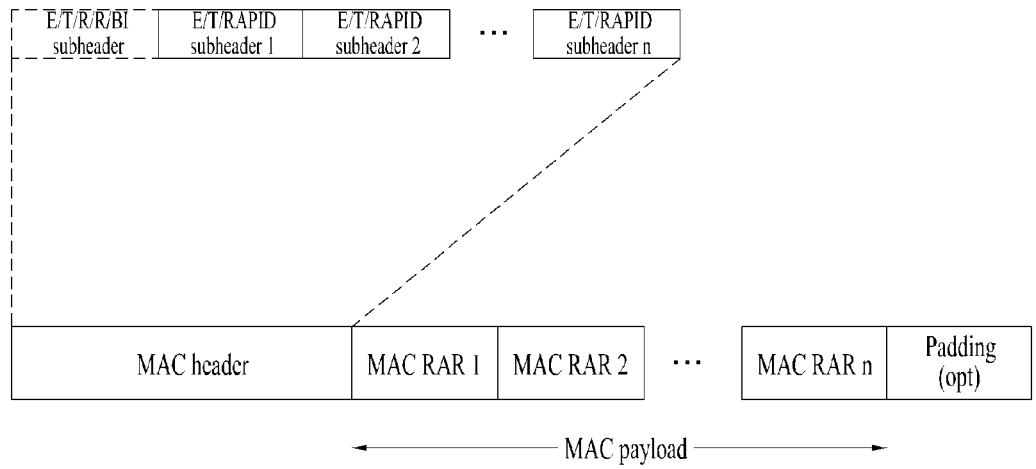
FIG. 12 illustrates an exemplary MAC PDU including a MAC header and MAC RARs, which is used in embodiments of the present disclosure.

FIG. 12 illustrates an exemplary MAC PDU including a MAC header and MAC RARs, which is used in embodiments of the present disclosure.

Referring to FIG. 12, the MAC PDU includes a MAC header, zero or more MAC RARs, and optional padding bits. The zero or more MAC RARs may make up MAC payload. The MAC header includes one or more MAC PDU subheaders. FIG. 10 may be referred to for these MAC PDU subheaders.

Figure 13:
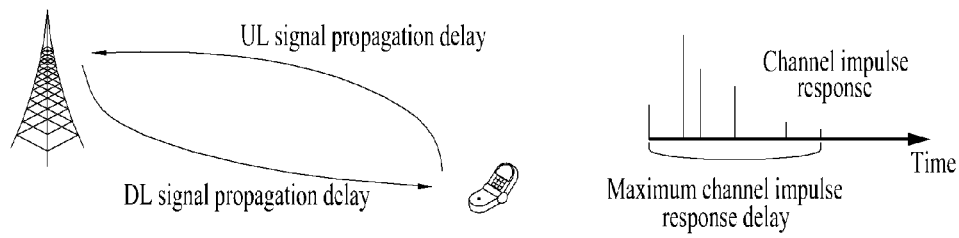
FIG. 13 illustrates a round trip delay taken into account for timing adjustment used in embodiments of the present disclosure.

FIG. 13 illustrates a round trip delay taken into account for timing adjustment used in embodiments of the present disclosure.

In the LTE/LTE-A system, an eNB transmits a TA message to a UE to set the starting point of a UL signal transmitted by the UE, taking into account the position of the UE and the propagation characteristics of a frequency band.

A TA value transmitted by the eNB may be represented by a Round Trip Delay (RTD). For example, the TA value is determined to be the sum of UL and DL propagation delays plus a maximum channel impulse response delay. That is, the TA value is intended for the eNB to receive and decode UL signals from UEs at the same timing, in consideration of the positions of the UEs and the propagation characteristics of frequency bands. Thus, the UEs transmit UL radio frames in FDD (frame structure type 1) and TDD (frame structure type 2) by advancing the transmission starting points of the UL radio frames by TA values. A related embodiment has been described before with reference to FIG. 8. $0 \leq N_{TA} \leq 20512$ where $N_{TA\ offset}=0$ in FDD and $N_{TA\ offset}=624$ in TDD.

Figure 14:
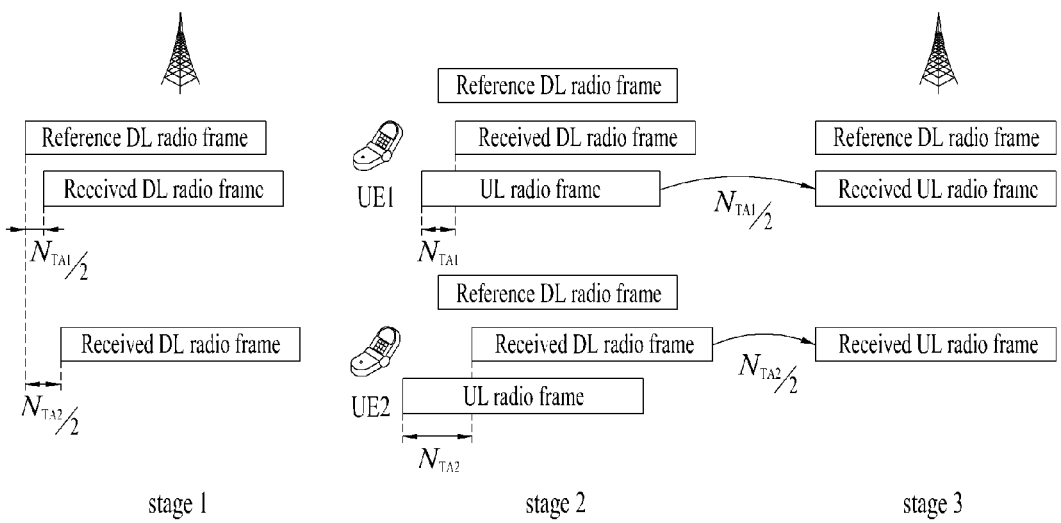
FIG. 14 illustrates an exemplary DL-UL transmission timing based on a Timing Advance (TA) value, used in embodiments of the present disclosure.

FIG. 14 illustrates an exemplary DL/UL transmission timing based on a TA value, used in embodiments of the present disclosure.

Referring to FIG. 14, an eNB transmits a DL radio frame to each UE in stage 1. As long a transmission delay as a DL signal propagation delay occurs due to the position of the UE and the propagation characteristics of a frequency band. If the RTDs of UE1 and UE2 are set to $N_{TA1}$ and $N_{TA2}$, respectively, UE1 and UE2 have DL signal propagation delays of $N_{TA1}/2$ and $N_{TA2}/2$ and UL signal propagation delays of $N_{TA1}/2$ and $N_{TA2}/2$, respectively.

The UEs transmit UL radio frames by advancing the transmission starting timings of the UL radio frames by $N_{TA1}$ and $N_{TA2}$, respectively with respect to received DL radio frames, and the transmitted UL radio frames experience the UL propagation delays of $N_{TA1}/2$ and $N_{TA2}/2$, respectively in stage 2. Consequently, the timing advances of $N_{TA1}$ and $N_{TA2}$ of the UL radio frames are counterbalanced with the sums of the DL and UL propagation delays and thus the eNB may receive the UL radio frames with their starting points aligned from the UEs in stage 3.

There are two types of CA, intra-band CA and inter-band CA. In intra-band CA, cells configured for a UE have adjacent band frequencies (i.e. intra-bands), whereas in inter-band CA, cells configured for a UE have frequencies far from each other (i.e. inter-bands).

In intra-band CA, since cells configured for a UE have similar frequency band characteristics, an RTD caused by the position of the UE and the propagation characteristics of a frequency band may not be different much between the cells. In contrast, the cells may have significantly different frequency band characteristics in inter-band CA. That is, since the cells differ in propagation characteristics such as the propagation range of a signal or diffraction property, a different TA may be allocated to each cell in inter-band CA.

Figure 15:
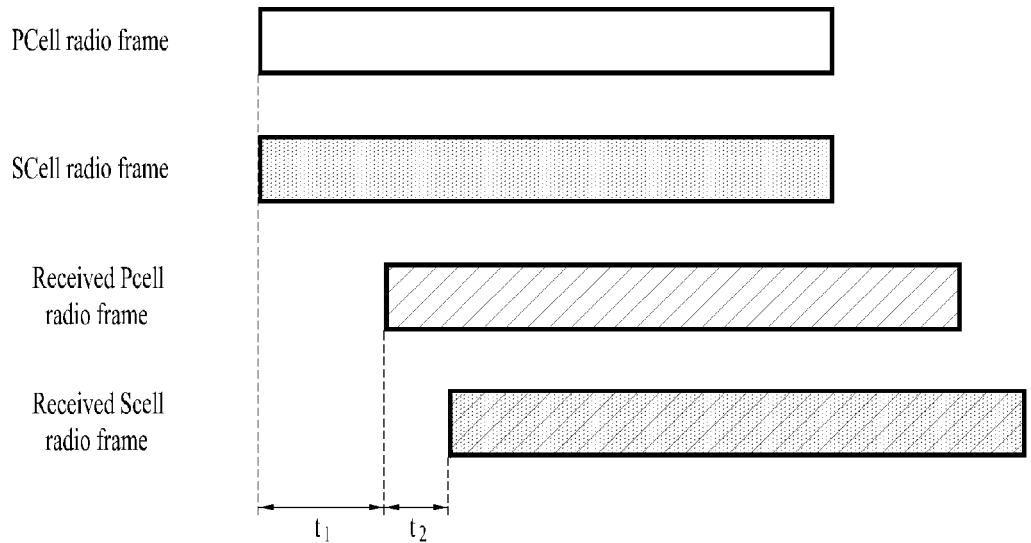
FIG. 15 illustrates a case where the transmission timings of two or more cells configured for a User Equipment (UE) are aligned with each other according to an embodiment of the present disclosure.

FIG. 15 illustrates a case where the transmission timings of two or more cells configured for a UE are aligned with each other according to an embodiment of the present disclosure.

Referring to FIG. 15, with two cells (e.g. a PCell and an SCell) configured for a UE, the reception timings of radio frames in the two cells transmitted by an eNB are aligned at the UE. Herein, t1 represents the DL propagation delay of the PCell and t2 represents the reception timing difference between the PCell and the SCell. t2 may be measured using a synchronization signal or an RS.

While the starting timings of the radio frames transmitted in the cells are aligned, the radio frames experience propagation delays due to the propagation characteristics of the cells. Since the eNB transmits a TA value for the PCell to the UE in a conventional wireless access system, the UE may receive a TA value twice as large as t1 from the eNB by a MAC message.

The UE may determine a TA value for the SCell by t1+t2. That is, the UE may calculate the TA value for the SCell by summing the TA value for the PCell and the reception timing difference acquired using a DL synchronization signal (or RS) of the PCell and a DL synchronization signal (or RS) of the SCell. However, if the transmission timings of DL frames in cells transmitted by the eNB are not aligned, the UE may not calculate a TA value in the same manner as described with reference to FIG. 15.

Figure 16:
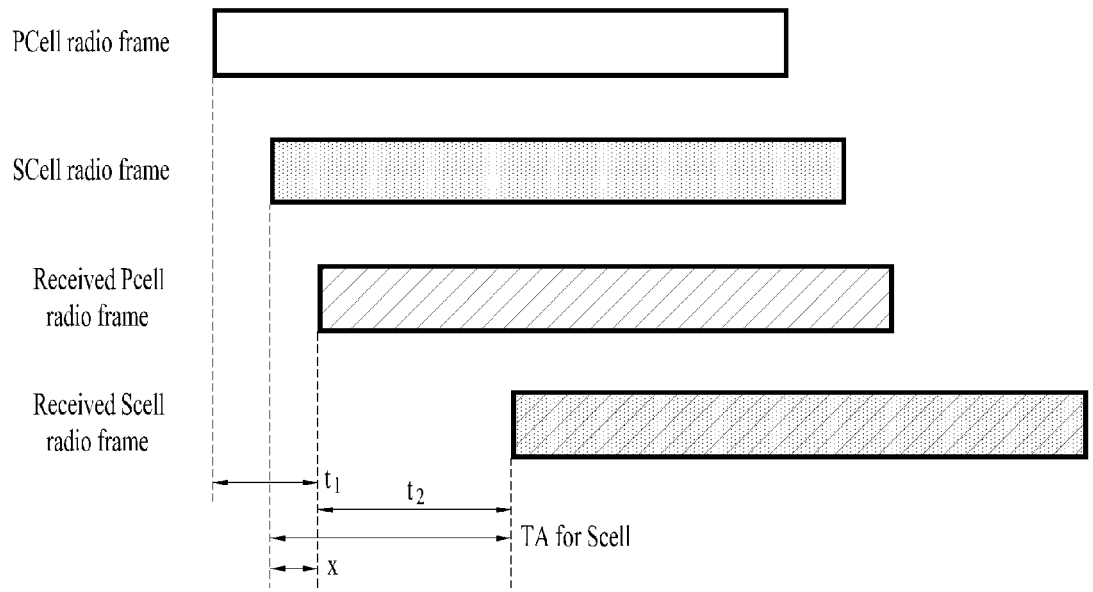
FIG. 16 illustrates a case where the transmission timings of two or more cells configured for a UE are not aligned with each other according to an embodiment of the present disclosure.

FIG. 16 illustrates a case where the transmission timings of two or more cells configured for a UE are not aligned with each other according to an embodiment of the present disclosure.

When an eNB transmits radio frames in two or more cells to a UE, the transmission starting timings of the radio frames may not be aligned. These radio frames also experience their respective DL propagation delays.

Herein, t1 represents a DL propagation delay of a PCell and t2 represents the reception timing difference between the PCell and an SCell. The UE may acquire the reception timing difference t2 using a TA value for the PCell and a synchronization signal or RS of the PCell. However, the UE may not calculate a TA value for the SCell (i.e. t2+x value) in the illustrated case of FIG. 16. This is because although the TA value for the SCell may be represented as t2+x value, the UE may not acquire information about the x value because of the different transmission starting timings of the PCell and the SCell.

Especially in the afore-described inter-band CA (or inter-band multi-CA) environment, it is difficult to align the transmission timings of signals in cells. Since the cells differ in frequency band characteristics, different RF devices are used according to the frequency bands of the cells and have different non-linear characteristics and different time delays due to the different frequency bands.

The constraint that the transmission timings of signals in cells should be aligned may become severe to the eNB and the network in the inter-band CA environment because misalignment between the transmission timings of DL signals in cells may not be avoided.

Moreover, a TA is defined only for a PCell in a legacy system. Since one or more SCells are configured in addition to an existing PCell for a UE in a CA environment, the conventional TA transmission scheme based on a PCell may not still be used for an SCell.

4.2 Method for Allocating TA Value

To overcome the above problem, it is provided that an eNB allocates a TA value to each of cells operating in inter-bands in inter-band CA. Accordingly, a description will be given below of methods for allowing a UE to perform a TA operation on each cell by transmitting a TA value for each cell to the UE by an eNB, in the case where two or more cells are configured for the UE.

If all of the two or more cells are configured in inter-bands, the UE may need TA values for all cells. If one or more cells are grouped into one group and thus one band, as many TA values as the number of bands may be required. In embodiments of the present disclosure, TA values required for a UE are referred to as multiple TAs.

In embodiments of the present disclosure, a current TA value is transmitted to a UE by a MAC message. The MAC message may be configured differently for an RAR or tracking. For example, a TA value allocated for an RAR may be 11 bits and a TA value allocated for tracking may be 6 bits.

4.2.1 Methods for Allocating TA Value Using DCI Format

Figure 17:
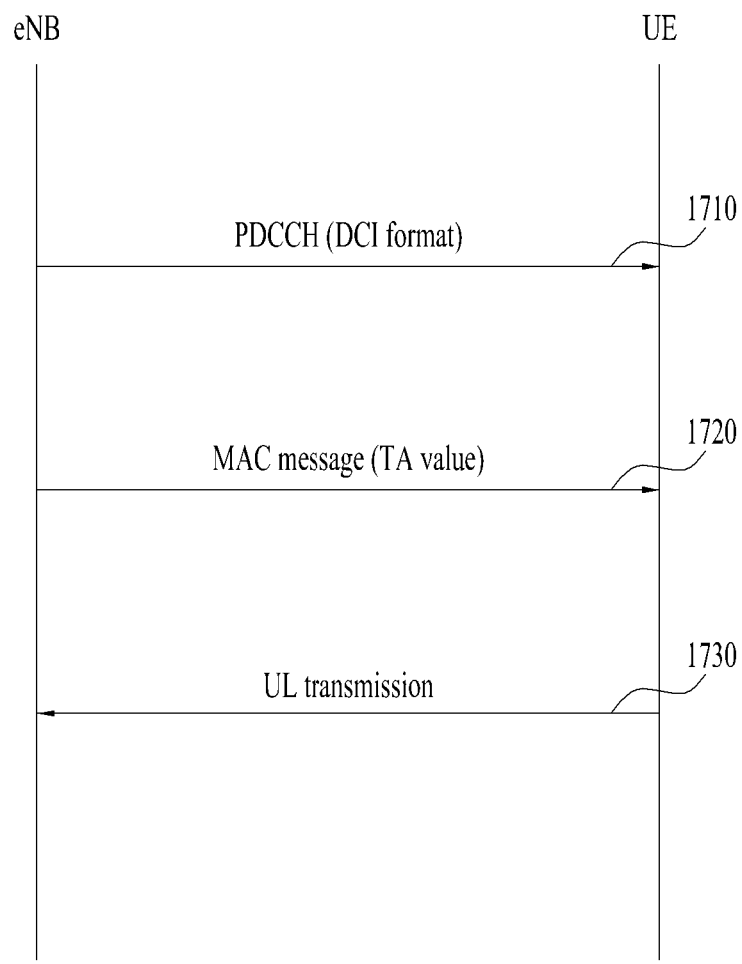
FIG. 17 illustrates methods for allocating a TA value using a Downlink Control Information (DCI) format according to an embodiment of the present disclosure.

FIG. 17 illustrates methods for allocating a TA value using a DCI format according to an embodiment of the present disclosure.

Referring to FIG. 17, an eNB may indicate a serving cell for which a MAC message carries a TA value, using reserved bits of a DCI format in a PDCCH (S1710).

For example, the eNB may indicate a TA value by an HARQ process number field or a DL assignment index field (only in TDD) as reserved bits of DCI Format 1A or by reserved bits padded to DCI Format 1C (i.e. a serving cell to which a TA value will be applied may be indicated). The reserved bits may be used as a serving cell indicator indicating a specific serving cell.

In FDD, the HARQ process number field may be 3 bits to indicate a current HARQ process out of a maximum number (8) of HARQ processes. In TDD, the HARQ process number field may be 4 bits to indicate a current HARQ process out of a maximum number (15) of HARQ processes, as illustrated in [Table 9]. [Table 9] lists maximum numbers of HARQ processes according to UL/DL configurations.

TABLE 9

| TDD UL/DL Configuration | Maximum HARQ process number |
|---|---|
| 0 | 4 |
| 1 | 7 |
| 2 | 10 |
| 3 | 9 |
| 4 | 12 |
| 5 | 15 |
| 6 | 6 |

However, if the CRC of DCI format 1A is scrambled or masked with an RA-RNTI, a P-RNTI, or an SI-RNTI, the HARQ process number field is used as reserved bits. Therefore, the HARQ process number field may be used as information that identifies or indicates a TA.

With continued reference to S1710 of FIG. 17, the eNB may indicate a cell to which the TA value set in the MAC message is applied from among the two or more cells configured for the UE by scrambling the CRC of DCI format 1A with an RA-RNTI, a P-RNTI, or an SI-RNTI and thus using the HARQ process number field as reserved bits. That is, the TA value set in the MAC message is not fixed as a TA value for a PCell. Rather, the TA value set in the MAC message may apply to a serving cell or band indicated by the HARQ process number field from among a plurality of serving cells.

For example, if the eNB configures the HARQ process number field of DCI Format 1A for a UE having five configured cells in FDD as illustrated in [Table 10] and transmits the HARQ process number field to the UE, the UE may determine and identify a cell to which a TA value received in a MAC message is to be applied, from the HARQ process number field. In TDD, the HARQ process number field is 4 bits, which may be configured by adding '0' to the start of the bits listed in [Table 10].

[Table 10] illustrates an exemplary HARQ process number field.

TABLE 10

| HARQ process number field | bits | Serving cell index (ServCellIndex) |
|---|---|---|
| 0 | 000 | 1 |
| 1 | 001 | 2 |
| 2 | 010 | 3 |
| 3 | 011 | 4 |
| 4 | 100 | 5 |
| 5 | 101 | 6 |
| 6 | 110 | 7 |
| 7 | 111 | 8 |

Referring to [Table 10], if the HARQ process number field is set to 3, the UE may determine that a TA value included in a MAC message applies to a serving cell having serving cell index 4. The mapping relationship between the HARQ process number field and the ServCellIndex field is merely exemplary and thus may be configured differently or in a different table. To support multiple TAs, the eNB may indicate a new mapping table or mapping method between the HARQ process number field and the ServCellIndex field to a UE by RRC signaling (not shown).

Referring to FIG. 17 again, the eNB may transmit at least one TA value to the UE by a MAC message described before with reference to FIGS. 9, 10, and 11 (S1720).

The UE may determine that the TA value received in step S1720 is for the serving cell indicated by the reserved bits of the DCI format of the PDCCH received in step S1710 and thus may determine the transmission timing of a radio frame to be transmitted in the serving cell. The UE may transmit a UL frame/UL signal to the eNB by reflecting the TA value in the indicated serving cell (S1730).

In another method, the eNB may allocate TA values to the UE by grouping one or more serving cells. For example, if one or more serving cells are grouped, one or more serving cells form one band. In step S1710, the reserved bits may indicate at least one band. In this case, the UE may determine that the TA value included in the MAC message is for the indicated band and may transmit UL radio frames to the eNB by applying the TA value to the serving cells of the band.

In another method, the eNB and the UE may apply the existing mapping relationship between a CIF and a serving cell index field indicated by RRC signaling as the mapping relationship between an HARQ process number field and a serving cell index field in FIG. 17.

4.4.4 Method for Allocating TA Value Using CIF

If a CIF is configured in a DCI format, the eNB may indicate to the UE that a TA value set in a MAC message applies to a serving cell indicated by the CIF.

For example, the eNB may indicate a mapping relationship between CIFs and serving cell indexes to the UE by RRC signaling (not shown). In this case, a CIF included in the PDCCH signal received in step S1710 indicates a specific serving cell according to the mapping relationship indicated by RRC signaling. If the UE receives a MAC message including a TA value in step S1720, the UE may transmit a UL frame/UL signal by applying the TA value to the serving cell indicated by the CIF in step S1730.

While the eNB and the UE may still use the existing mapping relationship between CIFs and serving cell indexes indicated by RRC signaling, the eNB may indicate a new mapping table or mapping relationship between CIFs and serving cell indexes to the UE in order to support multiple TAs.

4.2.3 Method for Allocating TA Value Using MAC Message

The eNB transmits multiple TA values to the UE by aggregating MAC messages so that the UE may adjust the transmission timings of UL radio frames.

For example, the eNB may aggregate as many MAC messages as the number of n serving cells configured for the UE. The payload size of the aggregated MAC message may be n times larger than the payload size of an existing MAC message including a TA value only for a PCell.

Or the eNB may aggregate as many MAC messages as the number of inter-bands, instead of MAC messages for all serving cells configured for the UE. Herein, inter-bands refer to multi-inter-band CA in which one or more serving cells are aggregated. One or more inter-bands may be configured for the UE. In this case, the payload size of the MAC message may be m times larger than the payload size of the existing MAC message including a TA value only for a PCell and the UE may apply the same TA value to one or more serving cells belonging to the same inter-band. That is, the UE may determine the transmission timings of UL radio frames by applying the same TA value to the serving cells of the same inter-band.

4.2.4 Method for Allocating Transmission Timing Difference Between Radio Frames The eNB may transmit a transmission timing difference between radio frames transmitted in serving cells to the UE. For example, if two serving cells are configured for the UE as illustrated in FIG. 16, the transmission timing difference y between a PCell and an SCell may be represented as t1−x value. In this case, the UE may calculate a TA value (i.e. x+t2) for the SCell to be t1−y+t2.

4.2.4.1 Method for Using Higher-Layer Signaling

The eNB may transmit a transmission timing difference y to the UE by higher-layer signaling. For example, the higher-layer signaling may be RRC signaling or MAC signaling.

The value of y may include the transmission timing difference between a PCell and each SCell.

Or the transmitting timing difference y may include sequential transmission timing differences between serving cell indexes.

Or the eNB may transmit a transmission timing difference for an inter-band to the UE, instead of transmission timing differences for all serving cells.

4.2.4.1 Method for Using PDCCH Signal

The eNB may transmit the transmission timing difference y to the UE by predetermined bits of a DCI format. For example, the reserved bits of a DCI format described before with reference to FIG. 17 may be used. In this case, the method described in Clause 4.2.1 or 4.2.2 may be used as a method for setting the reserved bits of a DCI format.

Herein, the value of y may include the transmission timing difference between a PCell and each SCell.

Or the transmitting timing difference y may include sequential transmission timing differences between serving cell indexes.

Or the eNB may transmit a transmission timing difference for an inter-band to the UE, instead of transmission timing differences for all serving cells.

5. Apparatuses

Figure 18:
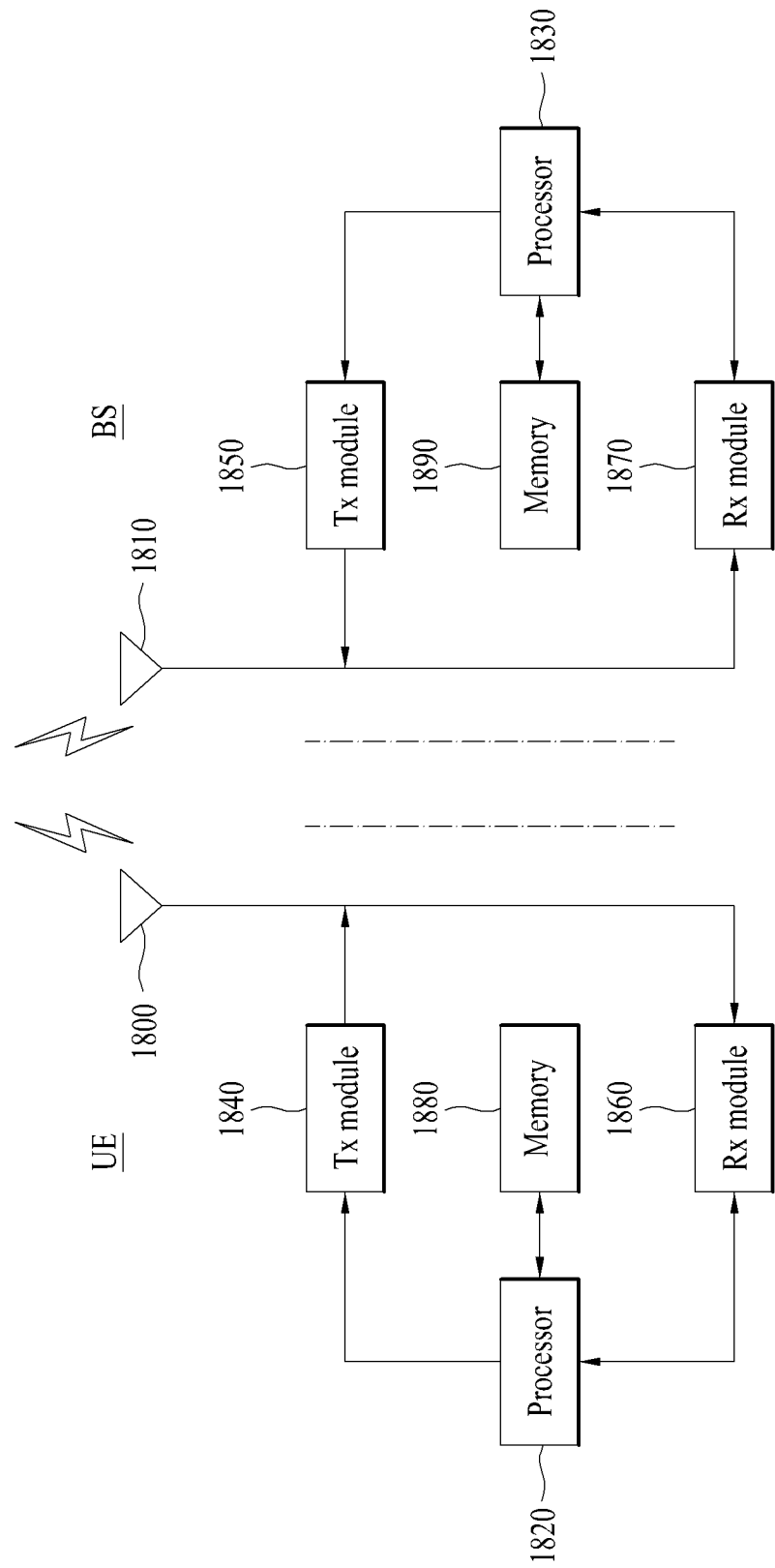
FIG. 18 is a block diagram of apparatuses that may implement the methods described in FIGS. 1 to 17.

Apparatuses illustrated in FIG. 18 are means that can implement the methods described before with reference to FIGS. 1 to 17.

A UE may act as a transmitter on a UL and as a receiver on a DL. An eNB may act as a receiver on a UL and as a transmitter on a DL.

That is, each of the UE and the eNB may include a Transmission (Tx) module 1840 or 1850 and a Reception (Rx) module 1860 or 1870, for controlling transmission and reception of information, data, and/or messages, and an antenna 1800 or 1810 for transmitting and receiving information, data, and/or messages.

Each of the UE and the eNB may further include a processor 1820 or 1830 for implementing the afore-described embodiments of the present disclosure and a memory 1880 or 1890 for temporarily or permanently storing operations of the processor 1820 or 1830.

The embodiments of the present disclosure may be performed using the components and functions of the UE and the eNB. For example, the processor of the eNB may allocate and transmit a TA value or a transmission timing difference y to the UE by combining the methods disclosed in Clause 1 to Clause 4. The processor of the UE may adjust the timings of one or more serving cells based on the TA value or the y value. For details, refer to Clause 1 to Clause 4.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a handheld PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1880 or 1890 and executed by the processor 1820 or 1830. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for adjusting a transmission timing in a wireless access system supporting a Carrier Aggregation (CA), the method comprising:
   receiving a downlink control information (DCI) format 1A via a Physical Downlink Control Channel (PDCCH) on a primary cell (Pcell), the DCI format 1A including a Hybrid ARQ (HARQ) process number field indicating a HARQ process out of a maximum number of HARQ processes;
   receiving a Medium Access Control (MAC) message including at least one timing advanced (TA) value, used for adjusting transmission time, to be applied to at least one secondary cell (Scell); and
   transmitting uplink signals by applying the at least one TA value in the at least one Scell,
   wherein if the DCI Format 1A is scrambled with a Random Access Radio Network Temporary Identifier (RA-RNTI), the HARQ process number field indicates the at least one Scell to which the at least one timing advanced (TA) value is to be applied instead of indicating the HARQ process,
   wherein the Pcell and the at least one Scell are aggregated as an inter-band carrier aggregation, and the carrier frequencies of the Pcell and the at least one Scell are in different bands, and
   wherein the at least one TA value is applied commonly to the at least one Scell of the inter-band.

2. A method for adjusting a transmission timing in a wireless access system supporting Carrier Aggregation (CA), the method comprising:
   transmitting a downlink control information (DCI) format 1A via a Physical Downlink Control Channel (PDCCH) on a primary cell (Pcell), the DCI format 1A including a Hybrid ARQ (HARQ) process number field indicating a HARQ process out of a maximum number of HARQ processes;
   transmitting a Medium Access Control (MAC) message including the at least one timing advanced (TA) value, used for adjusting transmission time, to be applied to at least one secondary cell (Scell); and
   receiving uplink signals in which the at least one TA value is applied in the at least one SCell,
   wherein if the DCI Format 1A is scrambled with a Random Access Radio Network Temporary Identifier (RA-RNTI), the HARQ process number field indicates the at least one SCell to which the at least one timing advanced (TA) value is to be applied, instead of indicating the HARQ process,
   wherein the Pcell and the at least one Scell are aggregated as an inter-band carrier aggregation, and the carrier frequencies of the Pcell and the at least one Scell are in different bands, and
   wherein the at least one TA value is applied commonly to the at least one Scell of the inter-band.

3. A terminal for adjusting a transmission timing in a wireless access system supporting Carrier Aggregation (CA), the terminal comprising:
   a transmitter;
   a receiver; and
   a processor configured to adjust the transmission timing,
   wherein the terminal is configured to:
   receive a downlink control information (DCI) format 1A via a Physical Downlink Control Channel (PDCCH) on a primary cell (Pcell), the DCI format 1A including a Hybrid ARQ (HARQ) process number field indicating a HARQ process out of a maximum number of HARQ processes thorough the receiver,
   receive a Medium Access Control (MAC) message including at least one timing advanced (TA) value, used for adjusting transmission time, to be applied to at least one secondary cell (Scell) through the receiver,
   apply the at least one TA value to the at least one serving cell by using the processor, and
   transmit uplink signals at a transmission timing adjusted by the at least one TA values through the transmitter,
   wherein if the DCI Format 1A is scrambled with a Random Access Radio Network Temporary Identifier (RA-RNTI), the HARQ process number field indicates the at least one SCell to which the at least one timing advanced (TA) value is to be applied instead of indicating the HARQ process,
   wherein the Pcell and the at least one Scell are aggregated as an inter-band carrier aggregation, and the carrier frequencies of the Pcell and the at least one Scell are in different bands, and
   wherein the at least one TA value is applied commonly to the at least one Scell of the inter-band.

* * * * *